No. 874,964. PATENTED DEC. 31, 1907.
W. McC. JAMIESON.
PNEUMATIC TIRE PROTECTOR.
APPLICATION FILED JULY 11, 1906.

Witnesses:

Inventor
William McC. Jamieson
By James L. Norris

UNITED STATES PATENT OFFICE.

WILLIAM McCORD JAMIESON, OF TE PAPA, NEAR ONEHUNGA, NEW ZEALAND.

PNEUMATIC-TIRE PROTECTOR.

No. 874,964.　　　　Specification of Letters Patent.　　　Patented Dec. 31, 1907.

Application filed July 11, 1906. Serial No. 325,728.

*To all whom it may concern:*

Be it known that I, WILLIAM McCORD JAMIESON, a subject of His Majesty the King of the United Kingdom of Great Britain and Ireland, resident of Te Papa, near Onehunga, in the Provincial District of Auckland and Colony of New Zealand, engineer, have invented a Pneumatic-Tire Protector, of which the following is a specification.

This invention is projected to protect the pneumatic tires of motors bicycles and other vehicles from being punctured or otherwise destroyed. This purpose is attained by a box formation being fitted to and around the tire with corrugations inside the box which are in immediate touch with the tire and receive its impact.

The accompanying drawing shows two figures of which

Figure 1:
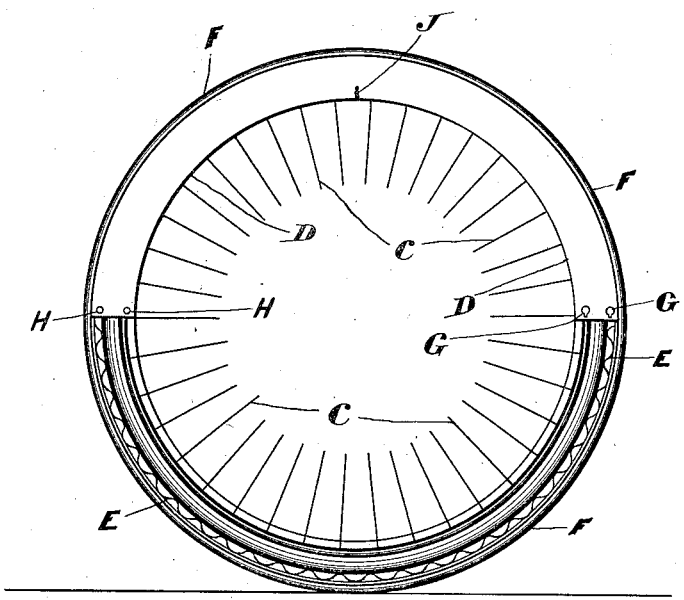
Figure 2:
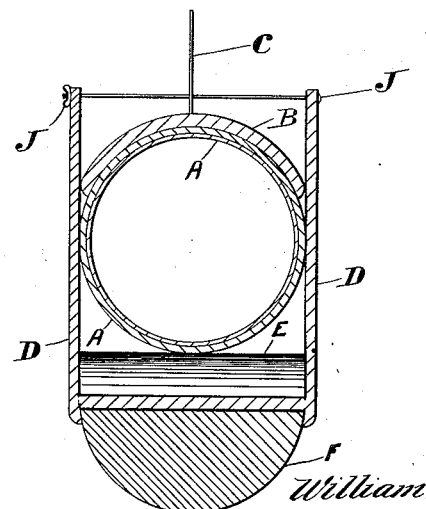

Figure 1 is a plan of the outer rim of wheel one half of it uncovered showing a pneumatic tire fitted thereto and corrugations in contact therewith and the other half covered with a box formation, and Fig. 2 is a sectional elevation showing the different parts fitted together.

The pneumatic tire A is fitted to the rim B of the wheel in the usual way with spokes C radiating from center to rim B, the box D is so fixed to the rim B and pneumatic tire A that the inner sides of the box D fit to the pneumatic tire A which is also brought into contact with the corrugations E fixed within the box D. The box D is so constructed that a hard or solid rubber tire F is fixed to it outwardly which serves as the working tire which is in contact with the road or way the motor bicycle or vehicle passes over. The box D is preferably made in two halves which can be fastened together in the usual way by the eyes G and the pins or buttons H, one half is shown in Fig. 1 and the other half is left off the wheel to show the inside construction of the protector, corrugations E, pneumatic tire A, and other parts. The inner portions of the sides of the box will be connected to one another by screw bolts, or rods with threaded ends J or by any other suitable fastenings.

The box D will preferably be made of steel though it may be made of any metal or material that will be suitable for the purpose, and the corrugated plate can likewise be made of steel or any other suitable material. Half spheres or projections that will act as transmitters may be used instead or in place of the corrugations E though when used they will not have the same beneficial effect. The corrugations E are shown in Fig. 1 straight crosswise or at right angles to the pneumatic tire A but they may be given a concave formation to fit the convex or outer side of the pneumatic tire A. The inside of the box D is shown in Fig. 2 as square but a slight deviation from this shape will however be immaterial.

Some of the advantages of this invention are that it does away with all puncturing of the pneumatic tire A, that the box D holds the sides of the pneumatic tire A in place so that it gives a better and deeper pneumatic action and at the same time does away with all cutting of the sides of the pneumatic tire A, that the corrugations E transmit to the pneumatic tire A, exactly the same action as the irregularities of the road would without injuring the pneumatic tire A and without destroying the buoyancy of the same, that the pneumatic tire A does not need to be blown up to the same pressure as ordinarily, and preferably will not, to get the needful resistance thus doing away with the present strain on the pneumatic tire A, and that the ordinary jar is taken by the pneumatic tire A on a more extended surface which lessens the wear on it.

This protector can be used on any size of pneumatic tire and will be made to suit the different sizes and shapes of the same whether they be used for motors, bicycles or other vehicles.

Having fully described my invention what I desire to claim and secure by Letters Patent is:—

1. In a pneumatic tire protector, the combination of a box having a transversely corrugated plate adapted to be fitted to said tire, and means for securing a solid tire to the box.

2. In a pneumatic tire protector, the combination of a sectional box having a transversely corrugated plate adapted to be fitted to said tire, and means for securing a solid tire to the box.

3. A pneumatic tire protector comprising a box having a transversely corrugated plate adapted to be fitted to said tire, said box furthermore constituting a felly for the reception of a solid tire.

4. A pneumatic tire protector comprising a sectional box having a transversely corrugated plate adapted to be fitted to said tire, said box furthermore constituting a felly for the reception of a solid tire, and means for connecting the sections.

5. A pneumatic tire protector comprising a box having a transversely corrugated plate adapted to be fitted to said tire, said box having braces and being furthermore provided with means for the reception of a solid tire.

6. A pneumatic tire protector comprising a sectional box having a transversely corrugated plate adapted to be fitted to said tire, said box having braces and being furthermore provided with means for the reception of a solid tire, and means for connecting the sections.

WILLIAM McCORD JAMIESON.

Witnesses:
GEORGE WILLIAM BASLEY,
HILDA MAY FRONDE.